July 9, 1974  C. R. VESTAL ET AL  3,823,119
POLYISOCYANATE-POLYISOCYANURATE PROCESS
Filed June 8, 1972  3 Sheets-Sheet 1 p = NUMBER OF ISOCYANURATE RINGS PER MOLECULE

3,823,119
POLYISOCYANATE-POLYISOCYANURATE PROCESS

Charles R. Vestal, Denver, and Carle C. Zimmerman, Jr., Littleton, Colo., assignors to Marathon Oil Company, Findlay, Ohio
Filed June 8, 1972, Ser. No. 260,844
Int. Cl. C08g 22/24, 22/28
U.S. Cl. 260—77.5 NC      8 Claims

ABSTRACT OF THE DISCLOSURE

Desired distribution of polyisocyanate-polyisocyanurates and rate of reaction is improved by controlling the surface area (i.e., particle size) of the metal cyanate reactant, a mathematical relationship exists between such distribution and the unit surface area of the metal cyanate for a given reaction time.

CROSS REFERENCES TO RELATED APPLICATIONS

The following U.S. patent applications relate generally to the field of the present invention: Ser. No. 663,186, filed Aug. 4, 1967, now U.S. Pat. 3,692,832, issued Sept. 19, 1972; U.S. Pat. 3,532,698, issued Oct. 6, 1970; Ser. No. 76,975 filed Sept. 30, 1970, now U.S. Pat. 3,720,632, issued Mar. 13, 1973; Ser. No. 38,554 filed May 18, 1970, now U.S. Pat. 3,684,807, issued Aug. 15, 1972; Ser. No. 156,549 filed June 24, 1971, now U.S. Pat. 3,773,695, issued Nov. 16, 1973; U.S. Pat. 3,631,000 issued Dec. 28, 1971; and Ser. No. 75,014 filed Sept. 24, 1970, now U.S. Pat. 3,755,401, issued Aug. 28, 1973.

BACKGROUND OF THE INVENTION

Field of the Invention

The present invention relates to particularly preferred methods for the production of product mixtures which comprise chemical compounds having both free isocyanate groups and also isocyanurate ring groups within a single molecule, generally classified in U.S. Patent Office Class 252, subclass 102.

Description of the Prior Art

A variety of United States patents teach techniques for the reaction of metal cyanates with organic compounds to produce a variety of products including drying oils, urethanes, isocyanurate-isocyanate salts, etc. These patents include U.S. 2,866,801; 2,866,802; 2,866,803; 3,017,420; 3,440,270; 3,458,448; 3,526,624; 3,526,655; 3,549,630; 3,553,122; 3,577,391; 3,584,028; and 3,627,-689.

However, the present invention teaches new methods, not taught by the above references, for the control of the ratio of free isocyanate groups to isocyanurate ring groups in the resulting product mixture and for control of reaction rate.

SUMMARY OF THE INVENTION

General Statement of the Invention

According to the present invention, the ratio of free isocyanate groups to isocyanurate ring groups in the polyisocyanate product mixture has been discovered to be capable of being decreased by decreasing the particle size (i.e. increasing the unit surface area) of the sodium cyanate or other metal cyanate employed in the reaction. This relatively reproducible control method permits the optimization of temperature, mole ratio of reactants, and other parameters to preset levels and then permits the variation of the free isocyanate to isocyanurate ring group ratio by merely changing the unit surface area of the metal cyanate fed to the reaction.

Additionally, the rate at which the reaction occurs can be controlled by varying the unit surface area of the metal cyanate used in the reaction while holding other parameters constant. Increasing the metal cyanate unit surface area increases the speed at which the reaction occurs.

Utility of the Invention

The present invention has wide applicability in reactions between metal cyanates and organic materials, particularly organic halides including, among others, those reactions which are described in the aforementioned United States patents and patent applications, all of which are hereby incorporated herein by reference. The resulting products include drying oils, urethane coatings, urethane-alkyd coatings, urethane foams, both solid and rigid, and the precursors for such foams, and other commercially valuable products.

DESCRIPTION OF THE PREFERRED EMBODIMENTS

Figure 1:
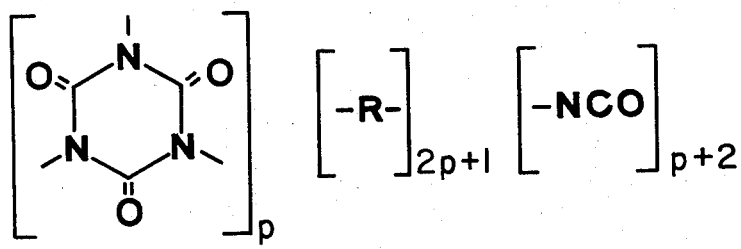
FIG. 1 shows the generic reaction scheme for the most preferred production of the present invention.

Starting Materials: The starting materials and reaction to which the improvements of the present invention are preferably applied may be summarized as follows:

In general, the invention involves the production of polyisocyanates through the reaction of an organic dichloride with a metal cyanate in the presence of a metal iodide or metal bromide, using an aprotic solvent as defined herein. FIG. 1 shows a summary of the overall reaction.

Referring to FIG. 1,

R=divalent alkyl or substituted divalent alkyl, for example:

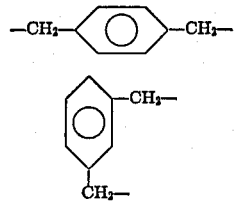

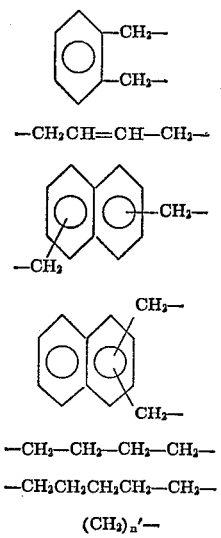

$-CH_2CH=CH-CH_2-$

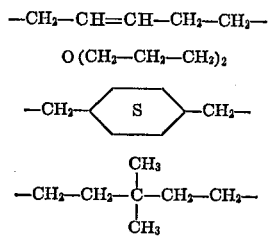

$-CH_2-CH_2-CH_2-CH_2-$ $-CH_2CH_2CH_2CH_2-CH_2-$ $(CH_2)_{n'}-$ where $n'=3-20$ $-CH_2-CH=CH-CH_2-CH_2-$ $O(CH_2-CH_2-CH_2)_2$ $-CH_2-\langle S \rangle-CH_2-$ $-CH_2-CH_2-\underset{\underset{CH_3}{|}}{\overset{\overset{CH_3}{|}}{C}}-CH_2-CH_2-$ and the alkyl, preferably lower alkyl, derivatives of the foregoing, M=alkali or alkaline earth metal, for example Li, Na, K, Rb, Cs, Be, Mg, Ca, etc., n=oxidation number of metal, M'=a metal, preferably an alkali or alkaline earth metal, wherein M' is selected from the same group described for M, above, and wherein M and M' may be the same or different, X=a very reactive nucleophile, for example I or Br, or mixtures thereof, m=oxidation state of the metal M', p=number of isocyanuratering groups, variable from 0 to over 15, but will preferably be from 0.1 to about 6 in order to produce the desirable isocyanurate-containing polyisocyanates of the present invention, k=the number of moles of metal cyanate present in the reaction mixture, preferably from 0.8 to about 1.5 and most preferably from 1.0 to about 1.10 moles of cyanate will be present per mole of chlorine in the organic dichloride, h=the number of moles of metal iodide or metal bromide, or mixture thereof, present in the reaction, preferably from 0.02 to about 0.25, and more preferably from 0.05 to about 0.15 moles of halide per mole of chlorine in the organic dichloride.

Figure 5:
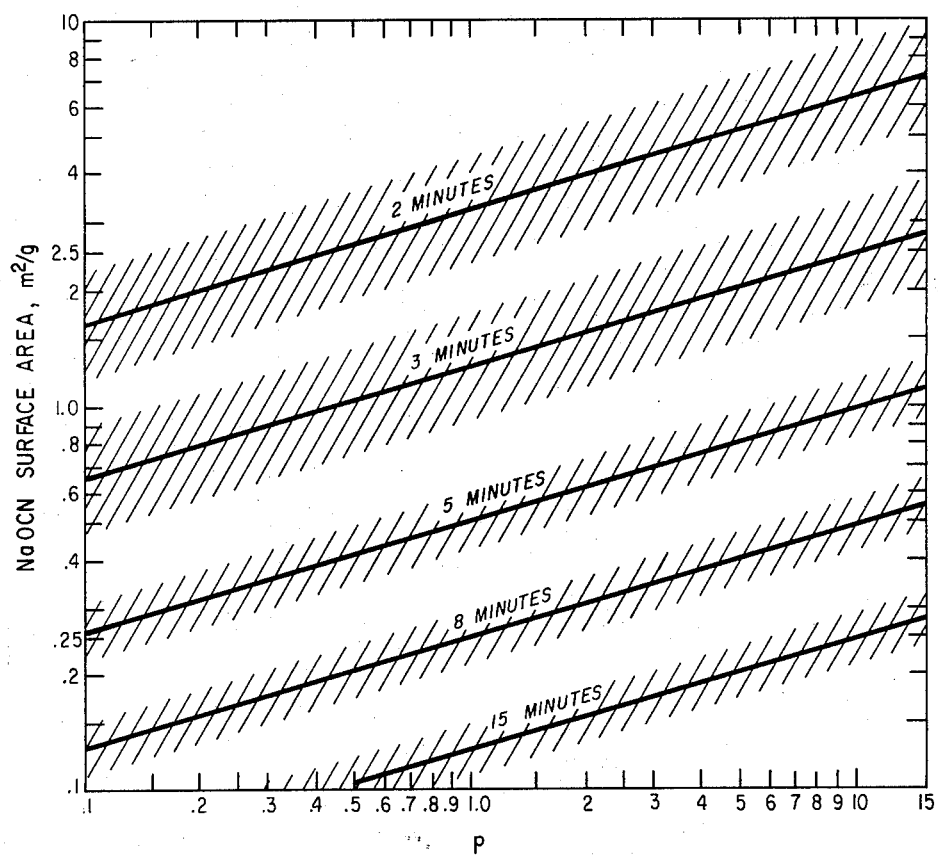
FIG. 5 shows the interrelationship between surface area and free isocyanate group to isocyanurate ring group molar ratio and reactor residence time. The shaded area denotes the preferred operating areas for Examples I–III.

Surface Area of Metal Cyanate: The unit surface area of metal cyanate employed in the present invention is, as stated above, an important feature of the invention. The precise unit surface area (square meters per gram) of metal cyanate employed in the particular reaction will be determined by the preselected reaction time (generally chosen for convenience and maximum utilization of equipment), the mole ratios of reactants (generally optimized for maximum conversion of the particular starting materials to the particular desired products), and temperature of the reaction (generally optimized for the particular solvent and starting materials employed). The unit surface area which will be selected according to the interrelationships is discussed herein and illustrated in FIG. 5.

In general, the unit surface area of the metal cyanates will be within the range of from about 0.1 to about 10, more preferably from about 0.2 to about 5, and most preferably from about 0.4 to about 3 square meters per gram.

For particularly desired values of "p" as discussed above, the preferred ranges of metal cyanate unit surface area will be as follows:

| Approximate value of "p" desired: | Preferred value of unit surface area of metal cyanate, square meters per gram |
|---|---|
| 0.5 | 0.1–2½ |
| 1 | 0.1–3 |
| 5 | 0.2–5 |
| 15 | 0.25–7 |

Figure 2:
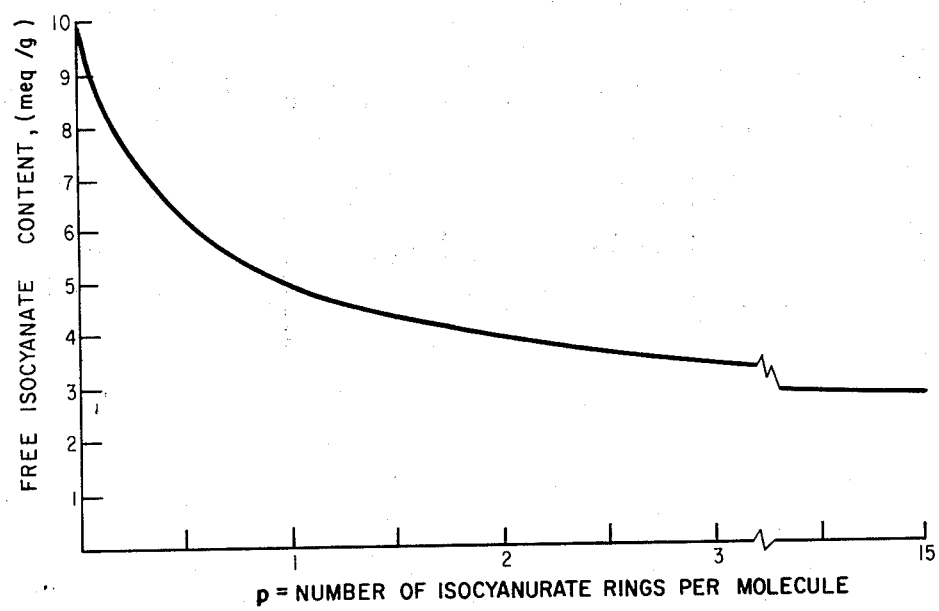
FIG. 2 shows the relationship between the free isocyanate content of the polyisocyanate product obtained in Examples I–III in milliequivalents per gram (a convenient way of expressing the ratio of free isocyanate groups to isocyanurate ring groups in the product mixture) plotted vs. the number of isocyanurate ring groups, $p$, as defined in the structures of FIG. 1.

For a given reaction time and given reactants the interrelationship of unit surface area of metal cyanate to the p obtained is strikingly consistent and can be expressed by the following approximate mathematical equation:

$$\overline{SA}=3.313-1.372T+0.132T^2-0.00432T^3+0.284\overline{P}$$
$$-0.00282\overline{P}T-0.000240\overline{P}T^2+0.0000290\overline{P}T^3$$
$$+0.00659\overline{P}^2+0.00154\overline{P}^2T-0.000278\overline{P}^2T^2$$
$$+0.00000964\overline{P}^2T^2$$

where $\overline{SA}$=The natural logarithm of the unit surface area (square meters per gram) of metal cyanate, $\overline{P}$=The natural logarithm of the ratio of free isocyanate groups to isocyanurate ring groups as defined in FIG. 1 and FIG. 2, T=reaction time, minutes, $SA=e^{\overline{SA}}$=The unit surface area (square meters per gram) of metal cyanate.

In general, it will be preferred to select the unit surface area of the metal cyanate according to the above mathematical relationship. The unit surface area of metal cyanate employed will preferably be within ±20%, more preferably within ±10%, and most preferably within ±5% of the value obtained from the above equation.

Reaction Media: By aprotic solvent is meant compositions which are liquid under the conditions of the reaction, which have a high dielectric constant (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions and which do not possess hydrogen atoms capable of hydrogen bonding with or transferring to anions in solution in the reaction mixture. The aprotic solvent can be composed of a mixture of liquids so long as the overall liquid compositions meet the above criteria. Preferred among the aprotic solvents are N-alkyl pyrrolidones (e.g., N-methyl pyrrolidone), N,N-dialkyl amides (e.g., N,N-dimethyl formamide (DMF) and N,N-dimethylacetamide), nitriles (e.g., acetonitrile), hexasubstituted phosphoramides (e.g., hexamethylphosphoramide), tetraalkylureas (e.g., tetramethyl urea), sulfoxides (e.g., dimethylsulfoxide), and sulfones (e.g., diphenyl sulfone), especially those in which substituents are alkyl groups, preferably methyl groups. The most preferred solvent for the reaction of this invention is DMF. Preferably from about 5 to about 100 and most preferably from about 10 to about 50 moles of the aprotic solvent will be present for each mole of the dichloride starting material.

It is preferred that the entire reaction sequence be conducted under substantially anhydrous condition. Preferably, less than about 1.0, more preferably less than 0.50, and most preferably less than about 0.01 percent by weight of water will be present in the reaction system.

Temperature and Pressure: The reaction of the present invention is preferably conducted at a temperature of from about 25 to about 330° C. and most preferably at from 50 to about 150° C. Pressure is not critical and may be from below one atmosphere to over 10,000 p.s.i.a. In most cases, it will be preferable to conduct the reaction in the absence of air. The pressure of the reaction, of course, will conveniently be the vapor pressure at the desired reaction temperature.

Reaction Time: The reaction to which the present invention constitutes an improvement will preferably be run at reaction times of from 0.001 to about 100, more preferably from 0.02 to about 25, and most preferably from 0.01 to about 2 hours. The reaction time will vary depending on the nature of the polyisocyanate being prepared. Longer reaction times at a given temperature will decrease the ratio of free isocyanate groups to isocyanurate ring groups.

Product Mixture: Products of this invention are mixtures of isocyanurate-containing polyisocyanates, i.e., they contain both free isocyanate groups and isocyanurate ring groups, within a single molecule. FIG. 2 relates the free isocyanate content of the polyisocyanate product to the average number, $p$, of isocyanurate ring groups per molecule. This is a convenient way to express the ratio of free isocyanate groups to isocyanurate ring groups.

The value of $p$ can be varied according to the process of the present invention. Also $p$ can be varied by varying the amount of metal iodide or metal bromide employed in the reaction mixture of the present invention, while holding all other parameters constant. For example, $p$ will average approximately 1 when the concentration of the halide is about 0.10 to 0.15 mole per mole of chlorine in the dichloride, $p$ will generally be above about 2 when from about 0.01 to 0.05 mole of halide per mole of chlorine in the dichloride. Preferred ratios of catalyst have been described earlier. Different solvents and temperatures will somewhat change the average value of $p$.

Batch or Continuous Basis: While the examples describe the invention on a continuous basis, it may of course, be practiced on a batch basis with starting materials being added to a batch-type reactor.

Examples: The invention will be better understood by reference to the following examples which are to be considered as illustrating the specific embodiments of the invention and as not limiting the invention in any way.

EXAMPLE I

Figure 3:
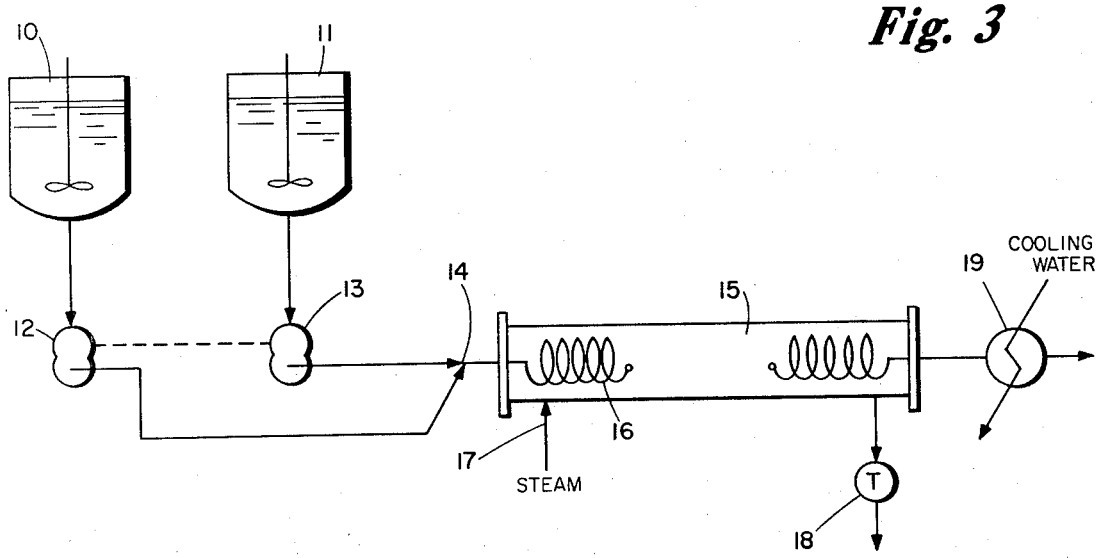
FIG. 3 shows schematically the apparatus ultilized in preferred embodiments of the present invention.

Referring to FIG. 3, to a tubular reactor 15, operating at a temperature of approximately 140° C. and at a pressure of approximately 12.5 p.s.i.a. is added 0.02 mole per hour of bis(chloromethyl)toluene (BCMT), 1.095 mole/mole Cl of sodium cyanate (NaOCN), 0.15 mole/mole Cl of sodium bromide (NaBr) and 1.9 liter/mole Cl of dimethylformamide (DMF). A 50 weight percent solution of BCMT and DMF is contained in a storage vessel 10, equipped with a mechanical stirrer and blanketed with a dry nitrogen gas to exclude moisture. Another container 11, is outfitted the same as element 10 and contains a slurry consisting of 90.4 weight percent DMF, 7.9 weight percent NaOCN, and 1.7 weight percent NaBr. The BCMT/DMF solution is metered from tank 10 by means of a Zenith gear pump 12. The slurry is metered by means of a Zenith gear pump 13, mechanically coupled on the same drive shaft as element 12. The ratio of capacities of elements 13:12 is 5:1. The stoichiometry of the feed materials in the BCMT/DMF solution and in the slurry reflect fixed pumping ratio. BCMT/DMF solution and the slurry are mixed in a concentric jet mixer 14, constructed from standard Swagelok fittings. The slurry is introduced along the axis and the BCMT/DMF solution is fed in the annulus to insure complete mixing of the reactants before entering the polyisocyanate reactor 15. This reactor is constructed of 240 feet of 0.035-in. wall, 316 SS tubing wound into a 5-in. diameter coil 16, and contained within a section of 6-in. Schedule 40 pipe. Steam 17, at a pressure of approximately 42 p.s.i.g., is condensed in the shell to maintain a constant reaction temperature of 140° C. Condensed steam is removed from the reactor by means of a steam trap 18. The length of tubing and the available pumping rates determine the range of solution residence times available. After reacting for 3.75 minutes, the polyisocyanate-polyisocyanurate product is cooled in a concentric pipe heat exchanger 20, constructed from standard Swagelok fittings and 316 SS tubing. The product mixture obtained in this experimental run analyzed as follows:

Free isocyanate content, meq./g. _____ 6.3
Residual halogen content:
    Percent Br _____ 1.03
    Percent Cl _____ 0.26

The mixture of polyisocyanates and polyisocyanurates is characterized by the value of $p$ (see FIGS. 1 and 2) and is found to be $p=0.5$. Conversion of the starting BCMT is calculated as 97 percent. Unit surface area of NaOCN is measured by BET nitrogen adsorption and found to be approximately 0.6 m.$^2$/g.

EXAMPLE II

This run is conducted exactly as Example I with the exception that the NaOCN is further ground to provide greater unit surface area. Specifically, the unit surface area as measured by BET nitrogen adsorption is approximately 1.34 m.$^2$/g. After reacting for 3.75 minutes, the polyisocyanate-polyisocyanurate product analyzes as follows:

Free isocyanate content, meq./g. _____ 2.8
Residual halogen content:
    Percent Br _____ Nil
    Percent Cl _____ 0.71

This product is a solid mass at room temperature. It is further characterized by $p=11$ and BCMT conversion of 98 percent.

EXAMPLE III

This run is conducted exactly as Example II with the exception that the residence time is reduced to 2.75 minutes. The polyisocyanate-polyisocyanurate product analyzes as follows:

Free isocyanate content, meq./g. _____ 6.3
Residual halogen content:
    Percent Br _____ 0.93
    Percent Cl _____ 0.31

Figure 4:
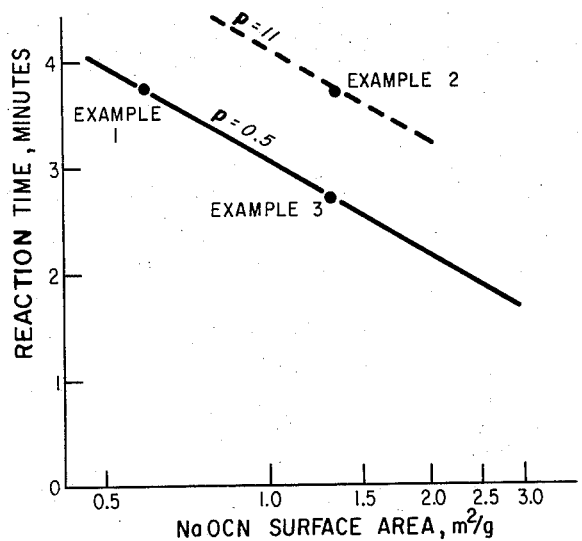
FIG. 4 shows the interrelationship of sodium cyanate surface area (a function of sodium cyanate particle size) and the reaction residence time on the resulting ratio of free isocyanate groups to isocyanurate ring groups in the polyisocyanate product of Examples I–III.

This product is characterized by $p=0.5$ and a BCMT conversion of 97 percent. Results of all three example runs are shown on FIG. 4.

Modification of the Invention

It should be understood that the invention is capable of a variety of modifications and variations which will be made apparent to those skilled in the art by a reading of the specification which are to be included within the spirit of the claims appended hereto.

What is claimed is:

1. In a process for the preparation of compounds comprising molecules containing both free isocyanate groups and isocyanurate ring groups within a single molecule and having the structure:

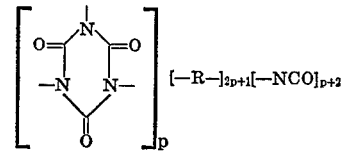

by reacting organic dichlorides with metal cyanates selected from the group consisting of alkali earth metal cyanate, alkali metal cyanate and mixtures thereof, in the presence of a metal iodide or metal bromide, in an aprotic solvent for a preselected reaction time, the improvement comprising in combination the steps of:

(a) determining from the following mathematical relationship, a unit surface area of said metal cyanate which corresponds within ±20%, to said preselected reaction time, which corresponds substantially to the desired ratio of said free isocyanate groups to said isocyanurate ring groups in the product:

$$\overline{SA} = 3.313 - 1.372T + 0.132T^2 - 0.00432T^3 + 0.284\overline{P}$$
$$- 0.00282\overline{P}T - 0.000240\overline{P}T^2 + 0.0000290\overline{P}T^3$$
$$+ 0.00659\overline{P}^2 + 0.00154\overline{P}^2T - 0.000278\overline{P}^2T^2$$
$$+ 0.00000964\overline{P}^2T^3$$

where $\overline{SA}$ = the natural logarithm of the unit surface (square meters per gram) of metal cyanate,
$\overline{P}$ = the natural logarithm of P,
T = reaction time, minutes,
SA = $e^{\overline{SA}}$ = the unit surface area (square meters per gram) of metal cyanate, (b) adjusting the particle size of said metal cyanate as necessary to achieve substantially said corresponding unit surface area as determined in step (b) above, (c) reacting from about 0.8 to about 1.5 moles of said metal cyanate of said corresponding unit surface area per mole of chlorine in said organic dichloride at a temperature of from about 25 to about 300° C. in the presence of from about 0.02 to about 0.25 mole of metal iodide or metal bromide per mole of chlorine in said organic dichloride for said preselected reaction time.

2. In a process for producing product mixtures comprising compounds containing in a single molecule both free isocyanate groups and isocyanurate ring groups, by reacting alkali metal and alkali earth metal cyanates and mixtures thereof with organic dichlorides to produce said mixtures in a given molar ratio of free isocyanate to isocyanurate ring groups, the improvement consisting of varying the unit surface area of said metal cyanate without varying the molar ratio of said metal cyanate to said organic dichloride by decreasing said ratio of said free isocyanate to said isocyanurate ring groups solely by increasing the unit surface area of said metal cyanate prior to its reaction with said organic dichloride or, increasing said ratio of said free isocyanate to said isocyanurate ring groups solely by selecting and reacting with said organic dichlorides, metal cyanates having a smaller unit surface area than said given unit surface area.

3. In a process for producing an isocyanurate-containing polyisocyanate product mixture comprising compounds containing in a single molecule both free isocyanate groups and isocyanurate ring groups and containing a desired predetermined molar ratio of said free isocyanate groups to said isocyanurate ring groups, by contacting alkali metal and alkali earth metal cyanate and mixtures thereof with organic dichloride at a temperature of from about 25 to about 300° C. in a mole ratio of from about 0.8 to about 1.5 moles of metal cyanate per mole of chlorine in said organic dichloride for a reaction time of from about 0.01 to about 2 hours in the conjoint presence of from 0.02 to about 0.25 mole of metal iodide or metal bromide and about 5 to about 100 moles of aprotic solvent per mole of said organic dichloride, the improvement comprising reducing the particle size of said metal cyanate to achieve a unit surface area within the range of from about 0.1 to about 10 square meters per gram, said size reduction being sufficient to achieve said desired ratio of free isocyanate groups to isocyanurate ring groups in said product mixture at the temperature employed during said contact of said metal cyanate with said organic dichloride.

4. In a process for producing product mixtures comprising chemical compounds containing in a single molecule both free isocyanate groups and isocyanurate ring groups, said product mixture having a desired predetermined molar ratio of said free isocyanate to said isocyanurate ring groups, by reacting alkali metal or alkali earth metal cyanate or mixtures thereof having a unit surface area within the range of from about 0.1 to about 10 square meters per gram, with organic dichlorides the improvement comprising reducing the particle size of said metal cyanate to the degree necessary to reduce the ratio of said free isocyanate groups to said isocyanurate ring groups to produce a product mixture of the desired predetermined ratio, said size reduction treatment being insufficient to reduce the particle size of said metal cyanate so as to decrease the ratio of said product mixture substantially below said desired predetermined ratio and reacting said metal cyanate with said organic dichloride for a time within the range of from about 0.01 to about 2 hours and at a temperature of from about 25 to about 300° C. in the presence of a metal iodide or metal bromide and a dipolar aprotic solvent.

5. The process of Claim 1 wherein said organic dichloride is bis(chloromethyl) toluene.

6. The process of Claim 2 wherein said organic dichloride is bis(chloromethyl) toluene.

7. The process of Claim 3 wherein said organic dichloride is bis(chloromethyl) toluene.

8 The process of Claim 4 wherein said organic dichloride is bis(chloromethyl) toluene.

References Cited
UNITED STATES PATENTS 3,573,259  3/1971  Argabright et al.
260—77.5 NC
3,627,689  12/1971  Argabright et al.
260—77.5 NC X
3,631,000  12/1971  Argabright et al.
260—77.5 NC HERBERT S. COCKERAM, Primary Examiner U.S. Cl. X.R.

260—2.5 AW, 18 TN, 22 TN

UNITED STATES PATENT OFFICE
CERTIFICATE OF CORRECTION

Patent No. 3,823,119　　　　　　　　Dated　July 9, 1974

Inventor(s)　CHARLES R. VESTAL ET AL

It is certified that error appears in the above-identified patent and that said Letters Patent are hereby corrected as shown below:

Col. 2, lines 22-28　　　　Delete in their entirety (repeat of description of Fig. 2.)

Col. 4, line 73:　　　　　Delete "330°C" and insert therefor --300°C--.

Signed and Sealed this

Thirteenth Day of September 1977

[SEAL]

*Attest:*

RUTH C. MASON　　　　　　　LUTRELLE F. PARKER
*Attesting Officer*　　　*Acting Commissioner of Patents and Trademarks*